(12) United States Patent
Hennecke et al.

(10) Patent No.: US 9,229,507 B1
(45) Date of Patent: Jan. 5, 2016

(54) MANAGING DATA CENTER POWER USAGE

(71) Applicant: Google Inc., Mountain View, CA (US)

(72) Inventors: Mark D. Hennecke, Cupertino, CA (US); Liuyi Zhang, La Jolla, CA (US)

(73) Assignee: Google Inc., Mountain View, CA (US)

( * ) Notice: Subject to any disclaimer, the term of this patent is extended or adjusted under 35 U.S.C. 154(b) by 328 days.

(21) Appl. No.: 13/847,946

(22) Filed: Mar. 20, 2013

Related U.S. Application Data

(60) Provisional application No. 61/613,213, filed on Mar. 20, 2012.

(51) Int. Cl.
*G06F 1/26* (2006.01)
*G06F 1/32* (2006.01)

(52) U.S. Cl.
CPC ........................................ *G06F 1/26* (2013.01)

(58) Field of Classification Search
CPC ......................................................... G06F 1/26
USPC ............................ 713/300, 320; 718/100, 102
See application file for complete search history.

(56) References Cited

U.S. PATENT DOCUMENTS

| | | | | |
|---|---|---|---|---|
| 7,581,125 | B2* | 8/2009 | Ranganathan et al. ....... | 713/320 |
| 8,365,175 | B2* | 1/2013 | Angaluri ........................ | 718/102 |
| 8,589,932 | B2* | 11/2013 | Bower et al. .................. | 718/102 |
| 8,656,408 | B2* | 2/2014 | Elshishiny et al. ............ | 718/108 |
| 2003/0079150 | A1* | 4/2003 | Smith et al. ................... | 713/320 |
| 2003/0126476 | A1* | 7/2003 | Greene .......................... | 713/300 |
| 2007/0220293 | A1* | 9/2007 | Takase .......................... | 713/320 |
| 2008/0059814 | A1* | 3/2008 | Esliger ........................... | 713/300 |
| 2009/0044032 | A1* | 2/2009 | Chainer ......................... | 713/320 |
| 2011/0213995 | A1* | 9/2011 | Chainer ......................... | 713/320 |
| 2013/0047004 | A1* | 2/2013 | Hwang .......................... | 713/300 |

FOREIGN PATENT DOCUMENTS

JP 08101777 A * 4/1996 .............. G06F 9/45

OTHER PUBLICATIONS

"X86 assembly language," at http://en.wikipedia.org/wiki/X86_assembly_language (14 pages), retrieved on Sep. 6, 2011.

* cited by examiner

*Primary Examiner* — Mark Connolly
(74) *Attorney, Agent, or Firm* — Fish & Richardson P.C.

(57) ABSTRACT

Techniques for managing a power usage of a computing device include receiving a set of executable instructions to perform a task on a computer of a plurality of computers; determining whether an expected amount of power used by the computer to execute the set of executable instructions to perform the task will exceed a desired power budget; based on the determination that the expected amount of power to execute the set of executable instructions will exceed the desired power budget, modifying the set of executable instructions; and executing the modified set of executable instructions at the computer to perform the task. The computer uses an actual amount of power to execute the modified set of executable instructions, and the actual amount of power is different than the expected amount of power.

32 Claims, 4 Drawing Sheets

MANAGING DATA CENTER POWER USAGE

CROSS-REFERENCE TO RELATED APPLICATIONS

This application claims priority under 35 U.S.C. §119 to U.S. Provisional Patent Application Ser. No. 61/613,213, filed on Mar. 20, 2012, entitled "MANAGING DATA CENTER POWER USAGE," the entire contents of which are incorporated herein by reference in their entirety.

TECHNICAL BACKGROUND

This disclosure relates to managing data center power usage and, more particularly, dynamically managing power usage of one or more computers operating in a data center.

BACKGROUND

Higher speed computers, in some instances, come with a cost—higher power consumption. For a small number of home PCs this extra power may be negligible when compared to the cost of running other electrical appliances in a household. However, in data center applications, where thousands or tens of thousands of microprocessors may be operated, power consumption becomes important.

In addition, the power consumed by a microprocessor is transformed into heat. A pair of microprocessors mounted on a single motherboard can draw 200-400 watts or more of power. If that power draw is multiplied by several thousand (or tens of thousands) to account for the computers in a data center, the potential for heat generation can be appreciated. Thus, not only must a data center operator pay for power to operate the computers, it must also pay to cool the computers. The cost of removing heat may be a major cost of operating large data centers.

Thus, the power usage of the computers of the data center may be managed to stay below a maximum power capacity. Some methods to manage the power usage include cycling the computers by turning on and off a subset of computers and/or by turning off cores (e.g., processors). Further methods include job allocation, e.g., jobs can be assigned to computers that have a lower power load so as to avoid overloading any particular computer; job scheduling, e.g., if a measured power usage for a computer is approaching its capacity, then jobs executed at the computer can be delayed; and execution rate control, e.g., if a measured power usage for a computer is approaching its capacity, then the computer can reduce its execution rate.

SUMMARY

This document describes systems and techniques by which the instructions to be performed by a computer can be modified with the goal of having performance and/or execution of the instructions require a lower amount of electrical power when executed by a computer, such as a computer in a rack of computers in a datacenter, or a virtualized computer that may be implemented across multiple physical computer server devices. For example, a system can identify executable instructions to be performed by one or more computers and determine whether execution of those instructions is likely to cause the computer to exceed a power budget that has been set for the computer. If so, the system can modify the instructions, including by reordering instructions, so that the computer does not exceed the power budget. The computer may then be caused to execute the instructions. Such management may occur simultaneously for each of many computers in a rack of computers, and each of a large number of computers across a computer datacenter. For example, total electrical power in the data center can be dynamically allocated to various racks and computers in the datacenter (e.g., a rack can be permitted to use a certain maximum level of power for a certain defined period, and in turn may assign power budgets to each board, processor, and/or core in the rack). The instructions going to each of the computers may be manipulated in the manners discussed here, simultaneously for each of the computers, so that each computer stays within its power budget (though computers may request higher power budgets if necessary up the hierarchy, and can give up power budget if requested to do so). The power budgets may also be simultaneously and dynamically reallocated, as necessary, and each of the computers may be provided to execute other instructions so as to stay within their newly reallocated budgets, so that the overall system can stay within its power budget while operating as close to maximum electrical capacity as is practical.

General embodiments according to the present disclosure include techniques (e.g., methods, systems, and apparatus) for managing a power usage of a computing device by: receiving a set of executable instructions to perform a task on a computer of a plurality of computers; determining whether an expected amount of power used by the computer to execute the set of executable instructions to perform the task will exceed a desired power budget; based on the determination that the expected amount of power to execute the set of executable instructions will exceed the desired power budget, modifying the set of executable instructions; and executing the modified set of executable instructions at the computer to perform the task. The computer uses an actual amount of power to execute the modified set of executable instructions, and the actual amount of power is different than the expected amount of power.

A first aspect combinable with any of the general embodiments may include identifying the desired power budget of the computer to execute the modified set of executable instructions to perform the task.

In a second aspect combinable with any of the previous aspects, modifying the set of executable instructions includes modifying the set of executable instructions so that the actual amount of power is substantially equal to the desired power budget.

In a third aspect combinable with any of the previous aspects, the actual amount of power is less than the expected amount of power.

In a fourth aspect combinable with any of the previous aspects, modifying the set of executable instructions includes re-ordering the set of executable instructions from a first order to a second order that is different than the first order.

In a fifth aspect combinable with any of the previous aspects, modifying the set of executable instructions includes inserting one or more null instructions into the set of executable instructions.

In a sixth aspect combinable with any of the previous aspects, the set of executable instructions has a first value for instructions per cycle, and the modified set of instructions has a second value for instructions per cycle that is different than the first value.

In a seventh aspect combinable with any of the previous aspects, the second value is based on the desired power budget of the computer to execute the modified set of executable instructions to perform the task.

An eighth aspect combinable with any of the previous aspects may include comparing the actual amount of power to the desired power budget.

A ninth aspect combinable with any of the previous aspects may include receiving, at the computing system, a second set of executable instructions at the computer to perform the task.

A tenth aspect combinable with any of the previous aspects may include, based on a variance between the actual amount of power and the desired power budget, modifying the second set of executable instructions at the computer to perform the task.

In an eleventh aspect combinable with any of the previous aspects, the computer uses a second actual amount of power to execute the modified second set of executable instructions, and the second actual amount of power is different than the actual amount of power.

A twelfth aspect combinable with any of the previous aspects may include simultaneously modifying instructions to be executed on the plurality of computers by determining expected amounts of power to be used in executed the instructions before modification, after modification, or both, and executing modified instructions on the large plurality of computers.

In a thirteenth aspect combinable with any of the previous aspects, modifying the set of executable instructions includes performing a dynamic binary translation on the set of executable instructions.

A fourteenth aspect combinable with any of the previous aspects may include continuously receiving sets of instructions at the computer to perform different tasks.

A fifteenth aspect combinable with any of the previous aspects may include modifying the sets of executable instructions by continuously modifying the set of executable instructions.

In a sixteenth aspect combinable with any of the previous aspects, modifying the set of executable instructions includes transforming between a low power instruction order and a high power instruction order.

In a seventeenth aspect combinable with any of the previous aspects, the plurality of computers are located in a data center.

Various implementations of a power management module according to the present disclosure may include one or more advantages. For instance, latency of the computer can be improved as compared to cycling the computer on/off in response to reducing power consumption of the computer. Specifically, the lag time of cycling the computer on/off may be reduced and/or prevented by modifying the set of executable instructions to be performed on the computer, so as to reduce power consumption of the computer. Furthermore, other benefits include finer granularity for stepping the power used by the computer. For example, cycling the computer on/off is a coarse granularity for stepping the power of the computer. However, reducing the power used by the computer results in smaller stepping of the power of the computer. As another example, a power management module according to the present disclosure may help prevent (all or substantially all) invalidation of data in a cache due to cycling of cores (i.e., processors) in order to reduce power. For example, resources associated with processors (such as data and instruction caches, as well as non-volatile storage) may remain available, whereas they may not be available if the processor and/or computer is turned off.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DETAILED DESCRIPTION

This specification describes systems, methods, computer programs, and storage media for dynamically managing power usage of one or more computers that operate in a data center and/or outside of a data center (e.g., in a home, business, or other location). Specifically, a computer can receive executable instructions. The instructions, when executed by the computer, perform a task. To execute the instructions, the computer uses an expected amount of power. The computer can modify the instructions such that while the modified instructions perform the same task (e.g., identical or substantially similar) when executed, the computer utilizes a differing power usage to execute the instructions.

Figure 1:
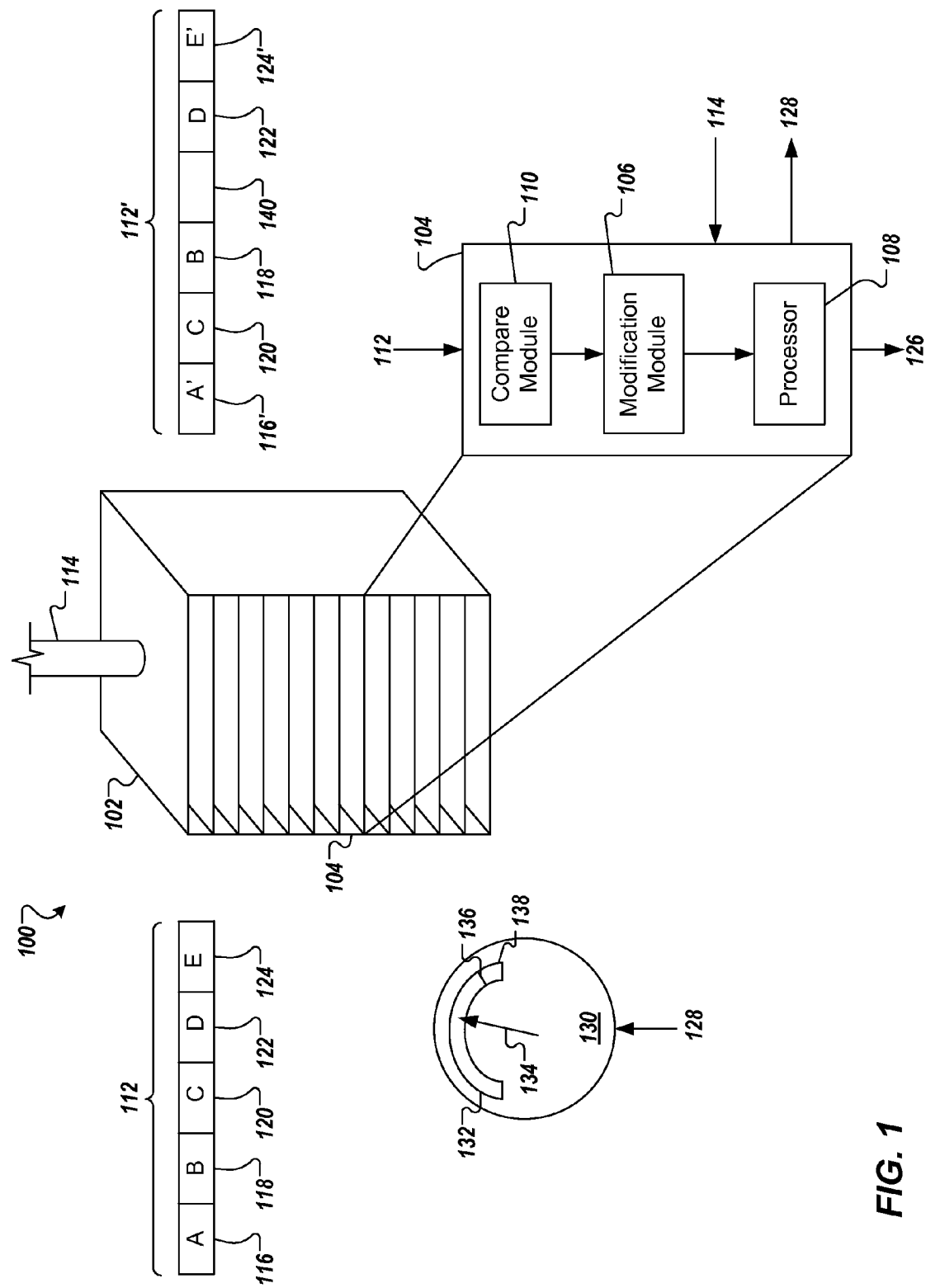
FIG. 1 illustrates an example system that can dynamically manage power usage of one or more computers operating in a data center.

FIG. 1 illustrates an example system 100 that dynamically manages power usage of one or more computers that operate in a data center. FIG. 1 depicts the system 100 that includes a rack 102 of rack-mounted trays 104. Each of the trays 104 can receive executable instructions, modify the executable instructions in view of a desired power budget, and process the modified executable instructions, described further below.

In the illustrated embodiment, one of the trays 104 is shown that includes an instructions modification module 106, a processor 108, a power comparison module 110, and memory (not shown). In some implementations, the tray 104 can include multiple processors 108. The tray 104 receives a set of executable instructions 112 and power from a power source 114. The set of executable instructions 112 includes individual instructions 116-124 (e.g., in binary form or another form). The processor 108 can execute the set of executable instructions 112 such that the set of executable instructions 112 accomplishes a task (e.g., a web search, web email task, or any other computer-implemented task requested by a user, remotely or otherwise).

The set of executable instructions 112 can further have an associated expected amount of power. Specifically, the processor 108 uses the expected amount of power when the processor 108 executes the set of executable instructions 112. However, the expected amount of power of the set of executable instructions 112 can exceed a desired power budget of the processor 108 during execution of the set of executable instructions 112. The desired power budget is an amount of power from the power source 114 that is desired to be used by the processor 108 to execute the set of executable instructions 112 and/or accomplish the specific task. In some implementations, the desired power budget is specific and based on each set of executable instructions 112 (e.g., the contents of the set of executable instructions 112). In some implementations, the desired power budget is substantially the same for each set of executable instructions 112.

In some implementations, the expected power usage of a computer (e.g., the processor 108 or the tray 104) can be dependent on several different factors, such as, for example, platform type, platform configuration, and/or application (e.g., task) to name but a few. For example, in some implementations, an expected power usage of a computer may be calculated based on platform type (e.g., type of processor, number of processors, number of cores, etc.) and particular application. The expected power usage of the computer can be determined, for example, from a lookup table in a spreadsheet that uses the selected platform and application. The lookup table can calculate the expected power usage from, for instance, an expected utilization (which can be set for all records from a user-selected distribution percentile) and a power-utilization function for the combination of platform and application.

To that end, the expected amount of power can be compared to the desired power budget. Specifically, in some implementations, the comparison module 110 receives the set of executable instructions 112. In some implementations, the comparison module 110 receives a signal that indicates the expected amount of power associated with the set of executable instructions 112. The comparison module 110 can compare the expected amount of power associated with the set of executable instructions 112 to the desired power budget. When the expected amount of power associated with the set of executable instructions 112 is less than the desired power budget, the processor 108 executes the set of executable instructions 112 to perform the task. In some examples, the comparison module 110 can transmit the set of executable instructions 112 to the processor 108. In some implementations, the processor 108 receives the set of executable instructions independently from the comparison module 110.

However, when the expected amount of power associated with the set of executable instructions 112 is greater than the desired power budget, the set of executable instructions 112 can be modified such that the expected amount of power associated with a modified set of executable instructions 112' is less than (or substantially equal to) the desired power budget. Specifically, in some implementations, the comparison module 110 transmits, and the instructions modification module 106 receives, the set of executable instructions 112. In some implementations, the instructions modification module 106 receives the set of executable instructions 112 independently from the comparison module 110.

The instructions modification module 106 modifies the set of executable instructions 112 to generate the modified set of executable instructions 112'. The modifications to the set of executable instructions 112 can include changing one or more of the individual instructions 116-124; inserting null instructions; and reordering of one or more of the individual instructions 116-124, described further below. In some implementations, the expected amount of power that is associated with the modified set of executable instructions 112' is less than the desired power budget. Furthermore, the modified set of executable instructions 112', when executed by the processor 108, accomplish the same (e.g., identical or substantially similar) task that is associated with the execution of the set of executable instructions 112. Thus, the modification to the set of executable instructions 112 does not modify the task that the set of executable instructions 112 accomplishes.

The processor 108 can execute the modified set of executable instructions 112' to produce output 126. The output 126, in some embodiments, may be the task or an output related to the task that is accomplished with the modified set of executable instructions 112'. Specifically, when the expected amount of power associated with the set of executable instructions 112 is greater than the desired power budget, as determined by the comparison module 110, the instructions modification module 106 transmits and the processor 108 receives the modified set of executable instructions 112'. The processor 108 uses an actual amount of power from the power source 114 to process the modified set of executable instructions 112'. The actual amount of power can differ from the expected amount of power associated with the modified set of executable instructions 112'. In some implementations, a signal 128 that relates to the actual amount of power can be output by the tray 104.

The actual amount of power can be monitored by a power meter 130. The power meter 130 can determine a dynamic power usage (e.g., the actual amount of power) of the processor 108 and/or the tray 104 when the processor 108 is executing the set of instructions 112 or the modified set of instructions 112'. The signal 128 can be received by the power meter 130 and may relate to the actual amount of power that is used by the processor 108 during execution of the modified set of executable instructions 112'. In some examples, the power meter 130 can include a power gauge 132, a power indicator 134, a power threshold 136, and an over threshold power region 138. The power gauge 132 displays possible values from a minimum power usage (such as 0) to a maximum power usage for the actual amount of power of the processor 108 during execution of the set of instructions 112 or the modified set of instructions 112'. The power indicator 134 can include, for example, a needle or other display indicator that can indicate a current actual amount of power via the power gauge 132 of the processor 108 during execution of the set of instructions 112 or the modified set of instructions 112'. The power threshold 136 can represent the desired power budget for the processor 108 during execution of the set of instructions 112 or the modified set of instructions 112'. The over threshold power region 138 can represent when the actual amount of power is greater than the desired power budget.

In some implementations, the power meter 130 can be implemented by the tray 104 or another controller of the system 100. In some implementations, the power meter is separate from the tray 104. For example, in some embodiments, the power meter 130 may be implemented as software (e.g., executable instructions in any appropriate programming language, machine code, or otherwise). Alternatively, or additionally, the power meter 130 may be implemented as application-specific hardware (e.g., as an ASIC or otherwise).

As mentioned above, the set of executable instructions 112 can be modified to the modified set of executable instructions 112' such that the expected amount of power associated with the set of executable instructions 112' is less than the desired power usage. This facilitates limitation of an amount of power that is provided by the power source 114 to the tray 104 and/or the processor 108 (e.g., the amount of power the tray 104 and/or the processor 108 can use at any given moment). Furthermore, the amount of power that the tray 104 and/or the processor 108 use is related to an amount of heat that is generated by the tray 104 and/or the processor 108. The generation of heat leads to inefficiencies with the system 100, such as processing speed and processing power of the processor 108. Thus, it is desired to minimize such inefficiencies. Moreover, with the generation of heat generated by the tray 104 and/or the processor 108, cooling is provided to the system 100 to compensate for such heat. Thus, with greater amounts of heat generation, a greater amount of cooling is to be provided, with can result in higher costs to operate system 100.

By modifying the set of executable instructions 112, other benefits can also occur. For example, latency of tray 104 and/or processor 108 is improved as compared to cycling the tray 104 and/or the processor 108 on/off in response to a reduction of power consumption of the tray 104 and/or the processor 108. Specifically, the lag time of cycling trays 104 and/or the processor 108 on/off is prevented by modification of the set of executable instructions to reduce power consumption of the processor 108. Furthermore, other benefits include finer granularity for stepping the power used by the tray 104 and/or the processor 108. For example, cycling the tray 104 and/or the processor 108 on/off is a coarse granularity for stepping the power of the rack 102. However, reduction of the power used by the tray 104 and/or the processor 108 results in smaller stepping of the power of the rack 102.

The instructions modifications module 106 employs power from the power source 114 to modify the set of executable instructions 112 to the set of modified set of executable instructions 112'. However, the amount of power used by the instructions modification module 106 is less than the amount that is saved when the processor 108 executes the modified set of executable instructions 112' as compared to the set of executable instructions 112. In other words, the amount of power that is saved by execution of the modified set of executable instructions 112', as compared to the set of executable instructions 112, is more than the amount of power for the instructions modification module 106 to modify the set of executable instructions 112.

The instruction modification module 106 can perform various modifications to the set of executable instructions 112 to generate the modified set of instructions 112'. For example, such modifications include any one of or any combination of the following modifications: changing of one or more of the individual instructions 116-124, inserting null instructions within the set of executable instructions 112, and reordering of one or more of the individual instructions 116-124. However, when the specific modification and/or combination of modifications are applied to the set of executable instructions 112 to generate the modified set of executable instructions 112', the modifications do not alter the task such that the set of executable instructions 112' perform the same task as the set of executable instructions 112. In some implementations, the type of modifications applied to the set of executable instructions 112 is based on a type of the tray 104 and/or the processor 108. In some implementations, the modifications of the set of executable instructions 112 includes performance of a dynamic binary translation on the set of executable instruction 112.

Changes to one or more of the individual instructions 116-124 is shown in FIG. 1 as the instruction 116 "A" of the set of executable instructions 112 is modified to the instruction 116' "A'" of the modified set of executable instructions 112'. Changes to the instruction 116 can include replacement of the contents of the instruction 116 with a different instruction in the instruction 116'. For example, instruction 116 "A" can be an instruction, that while is processed by the processor 108 quickly, the processor 108 uses a large amount of power to process the instruction 116 "A." The different instruction 116' "A'" can include an instruction, while it is processed by the process 108 more slowly, the processor 108 uses less power to process the instructions 116 "A."

Insertion of null instructions within the set of executable instructions 112 is shown in FIG. 1 as the modified set of executable instructions 112' including a null instruction 140.

Figure 2:
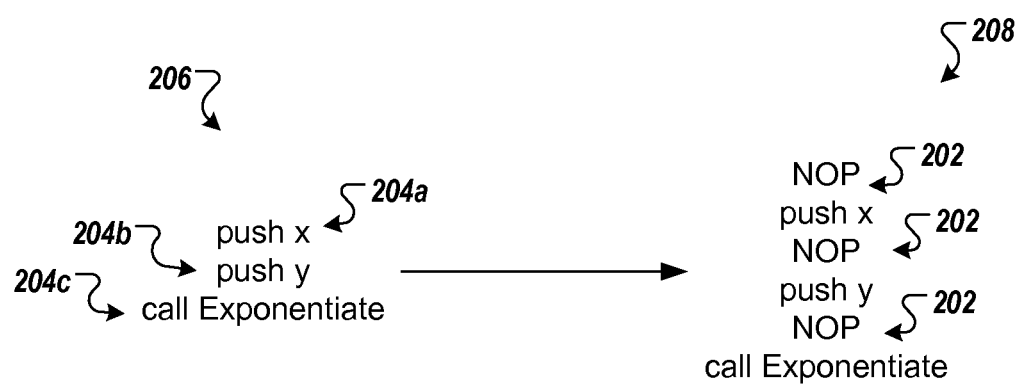
FIG. 2 illustrates an example of translation of computer instructions to dynamically manage power usage of one or more computers operating in a data center.

By including the null instruction 140, the modified set of executable instructions 112' are spread out with a gap. Thus, the processing of the modified set of executable instructions 112' is delayed by at least 1 cycle. Furthermore, the processor 108 uses less power during execution of the null instruction 140 as compared to one of instructions 116-124. In some implementations, the modified set of executable instructions 112' includes multiple null instructions. A further example of insertion of null instructions is shown in FIG. 2A. Specifically, a "NOP" (null) instruction 202 is inserted between each instructions 204a-204c of a set of executable instructions 206 to generate a modified set of executable instructions 208. Other examples of modifications to the set of executable instructions 112 include skipping prefetch instructions and minimizing code optimizations.

Reordering of one or more of the individual instructions 116-124 is shown in FIG. 1. For example, the instructions 118 "B" and 120 "C" of the set of executed instructions 112 are reordered within the modified set of executable instructions 112'. Specifically, the instruction 118 "B" is executed by the processor 108 prior to the instruction 120 "C" is executed by the processor 108. However, when the processor is executing the modified set of instructions 112', the instructions 118 and 120 are reordered such that the instruction 120' is executed by the processor 108 prior the instruction 118' is executed by the processor 108.

In other implementations, the actual amount of power used by the processor 108 can be compared to the desired power usage to create a feedback loop within the system 100. Specifically, the comparison module 110 can compare the actual amount of power used by the processor 108 during execution of the modified set of instructions 112' to the desired power budget. When the actual amount of power is not equal to the desired power budget, a variance is defined between the actual amount of power and the desired power budget. When the tray 104 receives the set of executable instructions 112 at a second time, the instructions modification module 106 can modify the executable instructions 112 based on the variance to generate a second modified set of instructions (not shown). The processor 108 uses a second amount of actual power when the processor 108 executes the second modified set of instructions (not shown), with the second actual amount of power differing from the actual amount of power used by the processor 108 to execute the modified set of executable instructions 112.

Figure 3:
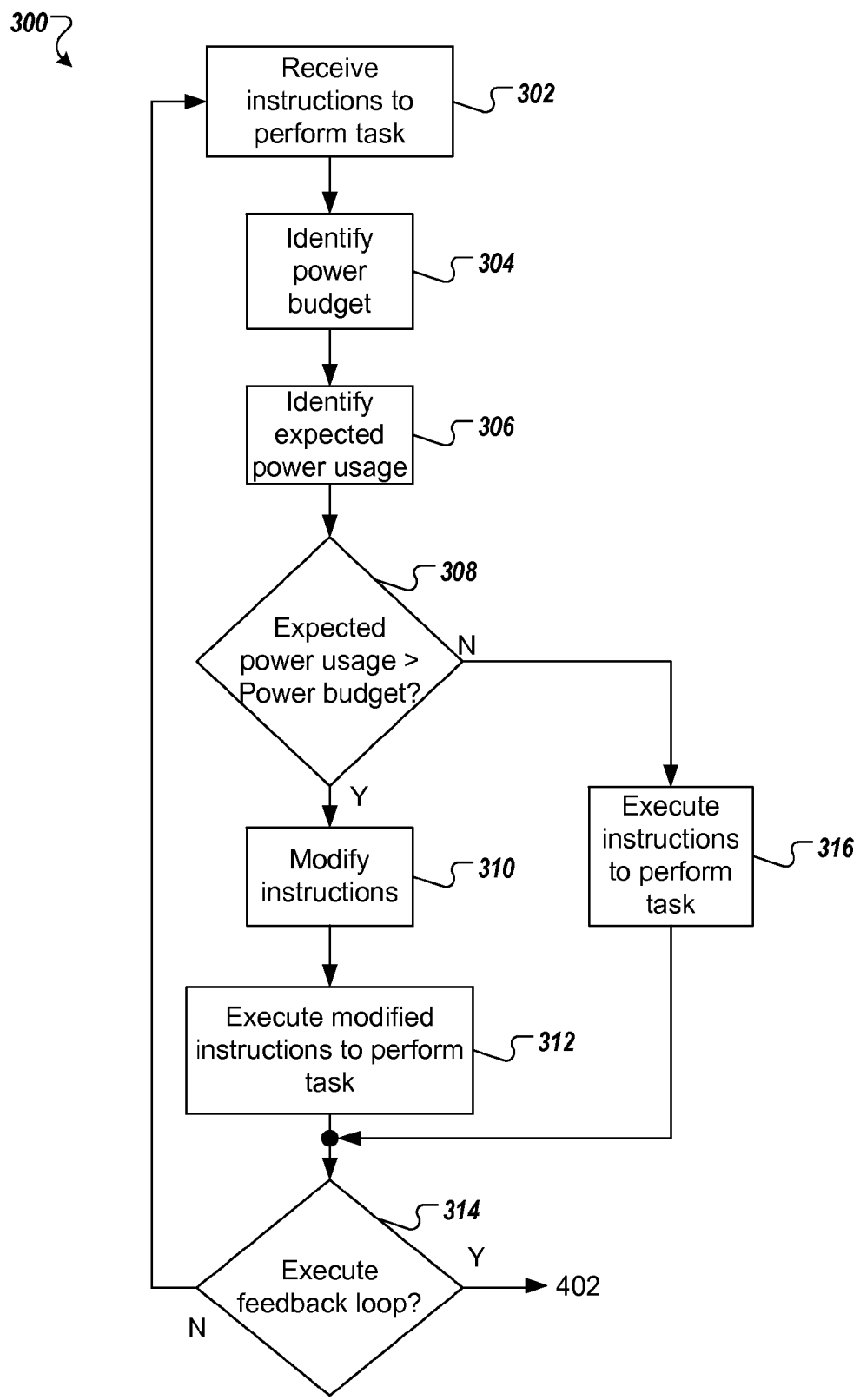
FIG. 3 is a flowchart of an example process for dynamically managing power usage of one or more computers.

FIG. 3 is a flowchart of an example process 300 for dynamically managing power usage of one or more computers. The example process 300 can be executed with or through one or more computing devices, such as though described with respect to system 100 and FIG. 1.

A set of executable instructions are received to perform a task (302). For example, the tray 104 receives the set of executable instructions 112. The set of executable instructions 112, when executed, perform the task. In some implementations, the set of executable instructions 112 are continuously received.

A desired power budget is identified for the set of executable instructions (304). For example, the desired power budget is an amount of power from the power source 114 that is desired to be used by the processor 108 when the processor executes the set of executable instructions 112.

An expected amount of power is identified (306). For example, the set of executable instructions 112 can have an associated expected amount of power. The expected amount of power is an amount of power the processor 108 would use to execute the set of executable instructions 112.

It is determined if the expected amount of power (308) is greater than the desired power budget. For example, the comparison module 110 compares the expected amount of power associated with the set of executable instructions 112 to the desired power budget.

If the expected amount of power is greater than the desired power budget, the set of executable instructions are modified (310). For example, the comparison module 110 determines that the expected amount of power of the set of executable instructions 112 is greater than the desired power budget. In response, the instructions modification module 106 modifies the set of executable instructions 112 to generate the modified set of executable instructions 112'. In some implementations, the set of executable instructions 112 are modified such that an actual amount of power used by the processor 108 to process the modified set of executable instructions 112' is substantially equal to the desired power budget. In some implementations, the set of executable instructions 112 are modified to include one or more null instructions. In some implementations, the set of executable instructions 112 include a first value for instructions per cycle, with the modified set of executable instructions 112' that have a second value for instructions per cycle different than the first value. In some implementations, the second value for the instructions per cycle is based on the desired power budget of the processor 108 to execute the modified set of instructions. In some implementations, the set of executable instructions 112 are modified based on a type of the tray 104 and/or the processor 108. In some implementations, modifying the set of executable instructions 112 includes performing a dynamic binary translation on the set of executable instructions 112. In some implementations, the set of executable instructions 112 are continuously received and the set of executable instructions 112 are continuously modified.

In some example implementations, the modified instructions 112' can be specific instructions to the computer and/or processor. For example, the modified instructions 112' can be specific instructions to lower a clock frequency of, for example, the processor, in order to lower an amount of power required to execute the instructions 112' (e.g., as compared to the instructions 112). As another example, the modified instructions 112' can be specific instructions to the processor to switch from a first power mode to a second power mode that has a lower power usage than the first power mode (e.g., a low power mode). In some aspects, modifying the instructions 112 can be performed at a binary level, an assembly level, and/or both the binary and assembly levels. In some aspects, the instructions 112 can be recompiled in a lower power mode to generate the modified instructions 112'.

The modified set of executable instructions are executed to perform the task (312). For example, the processor 108 can execute the modified set of executable instructions 112'. The processor 108 uses an actual amount of power from the power source 114 to process the modified set of executable instructions 112'. The actual amount of power can differ from the expected amount of power associated with the modified set of executable instructions 112'. In some implementations, the actual amount of power is less than the expected amount of power.

It is determined if a feedback loop should be executed (314). For example, the actual amount of power used by the processor 108 can be compared to the desired power usage to create a feedback loop within the system 100 to determine whether the actual amount of power is equal to the desired power usage.

Further, if the expected amount of power is not greater than the desired power budget, the set of executable instructions are executed to perform the task (316). For example, the processor 108 can execute the set of executable instructions 112. The process then proceeds to determining if a feedback loop should be executed (314).

Figure 4:
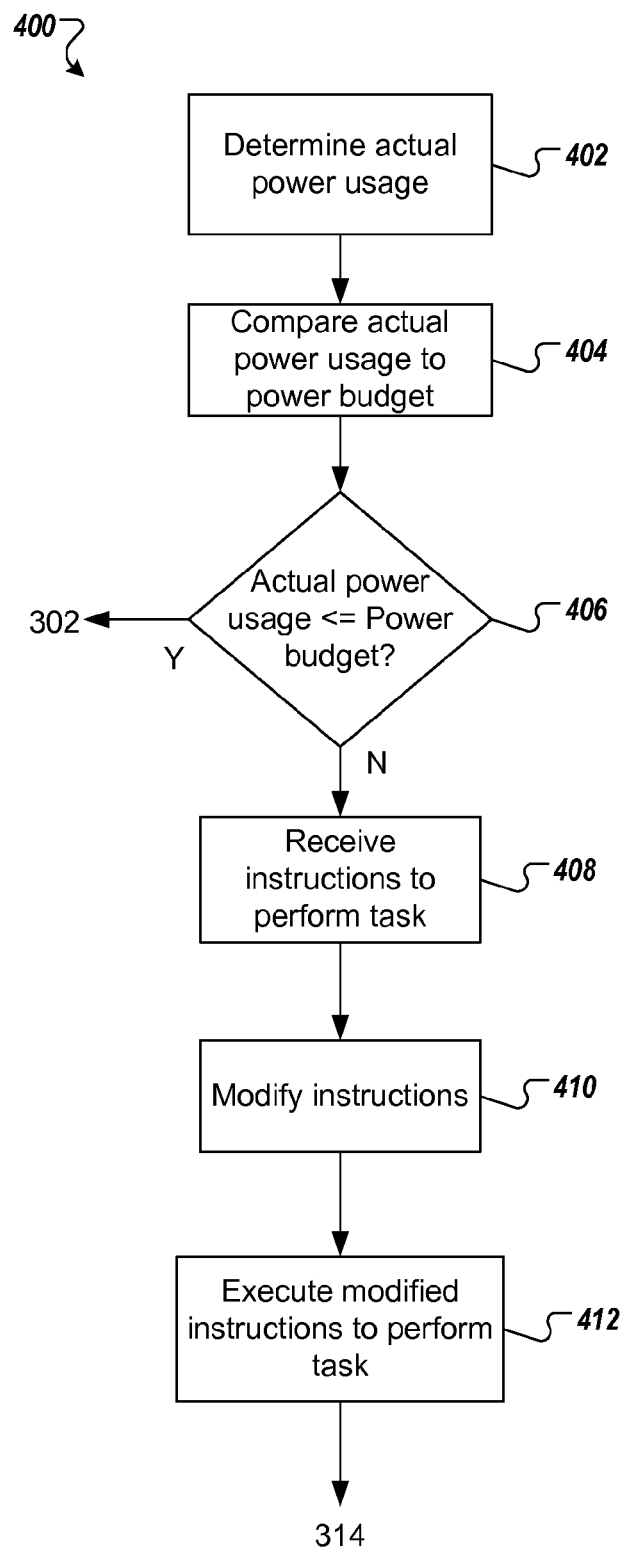
FIG. 4 is a flowchart of another example process for dynamically managing power usage of one or more computers.

FIG. 4 is a flowchart of another example process 400 for dynamically managing power usage of one or more computers. The example process 400 can be executed with or through one or more computing devices, such as though described with respect to system 100 and FIG. 1.

An actual amount of power is determined (402). For example, the processor 108 uses an actual amount of power from the power source 114 to process the modified set of executable instructions 112'. The actual amount of power can differ from the expected amount of power associated with the modified set of executable instructions 112'. The actual amount of power can be monitored by the power meter 130. The power meter 130 can determine the dynamic power usage (e.g., the actual amount of power) of the processor 108 when the processor 108 executes the set of instructions 112 or the modified set of instructions 112'.

The actual amount of power is compared to the desired power budget (404). For example, the comparison module 110 can compare the actual amount of power used by the processor 108 during execution of the modified set of instructions 112' to the desired power budget.

It is determined if the actual amount of power equals the desired power budget (406). For example, the comparison module 110 determines whether the actual amount of power used by the processor 108 during execution of the modified set of instructions 112' is equal to the desired power budget.

If the actual amount of power does not equal the desired power budget, a second set of executable instructions are received to perform a task (408). For example, the tray 104 receives a second set of executable instructions, similar to the set of executable instructions 112. The second set of executable instructions, when executed by the processor 108, perform the task. Furthermore, when the actual amount of power is not equal to the desired power budget, a variance is defined between the actual amount of power and the desired power budget.

The second set of executable instructions are modified in view of the variance (410). For example, when the tray 104 receives the second set of executable instructions, the instructions modification module 106 can modify the executable instructions 112 based on the variance to generate a second modified set of instructions.

The second modified set of executable instructions are executed to perform the task (412). The process then proceeds to step 314 of FIG. 3. For example, the processor 108 can execute the second modified set of executable instructions. The processor 108 uses a second amount of actual power during execution of the second modified set of instructions, with the second actual amount of power different from the actual amount of power used by the processor 108 to execute the modified set of executable instructions 112.

Further, if the actual power budget does equal the desired power budget, the process returns to step 302 of FIG. 3.

A number of implementations have been described. Nevertheless, it will be understood that various modifications may be made. For example, additional aspects of methods 300 and 400 may include more steps or fewer steps than those illustrated in FIGS. 3 and 4, respectively. Further, the steps illustrated in FIGS. 3 and 4 may be performed in different successions than that shown in these figures. Other variations in the order of steps in methods 300 and 400 are also possible. Accordingly, other implementations are within the scope of the following claims.

What is claimed is:

1. A computer-implemented method for managing a power usage of a computing device, the method comprising:
   receiving a first set of executable instructions to perform a first task on a computer of a plurality of computers;
   determining whether an expected amount of power used by the computer to execute the first set of executable instructions to perform the first task will exceed a desired power budget;
   based on the determination that the expected amount of power to execute the first set of executable instructions will exceed the desired power budget, modifying the first set of executable instructions;
   executing the modified first set of executable instructions at the computer to perform the first task, wherein the computer uses a first actual amount of power to execute the modified first set of executable instructions, and the first actual amount of power is different than the expected amount of power;
   comparing the first actual amount of power to the desired power budget;
   receiving a second set of executable instructions to perform a second task on the computer; and
   based on a variance between the first actual amount of power and the desired power budget, modifying the second set of executable instructions at the computer to perform the second task, wherein the computer uses a second actual amount of power to execute the modified second set of executable instructions, and the second actual amount of power is different than the first actual amount of power.

2. The method of claim 1, further comprising identifying the desired power budget of the computer to execute the modified first set of executable instructions to perform the first task.

3. The method of claim 2, wherein modifying the first set of executable instructions comprises modifying the first set of executable instructions so that the first actual amount of power is substantially equal to the desired power budget.

4. The method of claim 1, wherein the first actual amount of power is less than the expected amount of power.

5. The method of claim 1, wherein modifying the first set of executable instructions comprises re-ordering the first set of executable instructions from a first order to a second order that is different than the first order.

6. The method of claim 1, wherein modifying the set of executable instructions comprises inserting one or more null instructions into the set of executable instructions.

7. The method of claim 1, wherein the first set of executable instructions comprises a first value for instructions per cycle, and
   wherein the modified first set of instructions comprises a second value for instructions per cycle that is different than the first value.

8. The method of claim 7, wherein the second value is based on the desired power budget of the computer to execute the modified first set of executable instructions to perform the first task.

9. The method of claim 1, further comprising simultaneously modifying instructions to be executed on the plurality of computers by determining expected amounts of power to be used in executing the instructions before modification, after modification, or both, and executing modified instructions on the plurality of computers.

10. The method of claim 1, wherein modifying the set of executable instructions comprises performing a dynamic binary translation on the set of executable instructions.

11. The method of claim 1, further comprising continuously receiving sets of executable instructions at the computer to perform different tasks, and
   modifying the sets of executable instructions by continuously modifying each set of executable instructions.

12. The method of claim 1, wherein modifying the first set of executable instructions comprises transforming between a low power instruction order and a high power instruction order.

13. The method of claim 1, wherein the plurality of computers are located in a data center.

14. The method of claim 1, wherein modifying the first set of executable instructions comprises skipping pre-fetch instructions in a pipelined computer.

15. An apparatus comprising a tangible, non-transitory machine-readable medium comprising instructions executable with a computing system to perform operations comprising:
   receiving a first set of executable instructions to perform a first task by a computer of a plurality of computers in a data center;
   determining whether an expected amount of power used by the computer to execute the first set of executable instructions to perform the first task will exceed a desired power budget;
   based on the determination that the expected amount of power to execute the first set of executable instructions will exceed the desired power budget, modifying the first set of executable instructions;
   executing the modified first set of executable instructions at the computer to perform the first task, wherein the computer uses a first actual amount of power to execute the modified first set of executable instructions, and the first actual amount of power is different than the expected amount of power;
   comparing the first actual amount of power to the desired power budget;
   receiving a second set of executable instructions at the computer to perform a second task; and
   based on a variance between the first actual amount of power and the desired power budget, modifying the second set of executable instructions at the computer to perform the second task, wherein the computer uses a second actual amount of power to execute the modified second set of executable instructions, and the second actual amount of power is different than the first actual amount of power.

16. The apparatus of claim 15, wherein modifying the first set of executable instructions comprises modifying the first set of executable instructions so that the first actual amount of power is substantially equal to the desired power budget.

17. The apparatus of claim 15, wherein the first actual amount of power is less than the expected amount of power.

18. The apparatus of claim 15, wherein modifying the first set of executable instructions comprises re-ordering the first set of executable instructions from a first order to a second order that is different than the first order.

19. The apparatus of claim 15, wherein modifying the set of executable instructions comprises inserting one or more null instructions into the set of executable instructions.

20. The apparatus of claim 15, wherein the first set of executable instructions comprises a first value for instructions per cycle, and
   wherein the modified first set of instructions comprises a second value for instructions per cycle different than the first value, and the second value is based on the desired power budget of the computer to execute the first set of executable instructions to perform the first task.

21. The apparatus of claim 15, wherein modifying the set of executable instructions comprises performing a dynamic binary translation on the set of executable instructions.

22. The apparatus of claim 15, wherein receiving the first set of executable instructions at the computer to perform the first task comprises continuously receiving sets of executable instructions at the computer to perform tasks, and
wherein modifying the first set of executable instructions comprises continuously modifying each set of executable instructions.

23. The apparatus of claim 15, wherein modifying the first set of executable instructions comprises skipping pre-fetch instructions in a pipelined computer.

24. A system for managing a power usage of a data center, the system comprising:
one or more memory modules that store a power management module;
one or more processors operable to execute the power management module, the power management module operable when executed to perform operations comprising:
receiving a first set of executable instructions at a computer in a plurality of computers in a data center to perform a first task;
determining whether an expected amount of power used by the computer to execute the first set of executable instructions to perform the first task exceeds a desired power budget;
based on the determination that the expected amount of power to execute the first set of executable instructions exceeds the desired power budget, modifying, with the computer, the first set of executable instructions;
executing the modified first set of executable instructions at the computer to perform the first task, wherein the computer uses a first actual amount of power to execute the modified first set of executable instructions, and the first actual amount of power is different than the expected amount of power;
comparing the first actual amount of power to the desired power budget;
receiving, at the computing system, a second set of executable instructions at the computer to perform a second task; and
based on a variance between the first actual amount of power and the desired power budget, modifying the second set of executable instructions at the computer to perform the second task, wherein the computer uses a second actual amount of power to execute the modified second set of executable instructions, and the second actual amount of power is different than the first actual amount of power.

25. The system of claim 24, wherein modifying the first set of executable instructions comprises modifying the first set of executable instructions so that the first actual amount of power is substantially equal to the desired power budget.

26. The system of claim 24, wherein the first actual amount of power is less than the expected amount of power.

27. The system of claim 24, wherein modifying the first set of executable instructions comprises re-ordering the first set of executable instructions from a first order to a second order different than the first order.

28. The system of claim 24, wherein modifying the set of executable instructions comprises inserting one or more null instructions into the set of executable instructions.

29. The system of claim 24, wherein the first set of executable instructions comprises a first value for instructions per cycle, and
wherein the modified first set of instructions comprises a second value for instructions per cycle different than the first value, and the second value is based on the desired power budget of the computer to execute the first set of executable instructions to perform the first task.

30. The system of claim 24, wherein modifying the set of executable instructions comprises performing a dynamic binary translation on the set of executable instructions.

31. The system of claim 24, wherein receiving the first set of executable instructions at the computer to perform the first task comprises continuously receiving sets of instructions at the computer to perform tasks, and
wherein modifying the first set of executable instructions comprises continuously modifying each set of executable instructions.

32. The system of claim 24, wherein modifying the first set of executable instructions comprises skipping pre-fetch instructions in a pipelined computer.

* * * * *